Feb. 19, 1935.  W. V. D'A. RUTHERFORD ET AL  1,992,015
ROTATIVE WING AIRCRAFT
Filed April 25, 1934  2 Sheets-Sheet 1
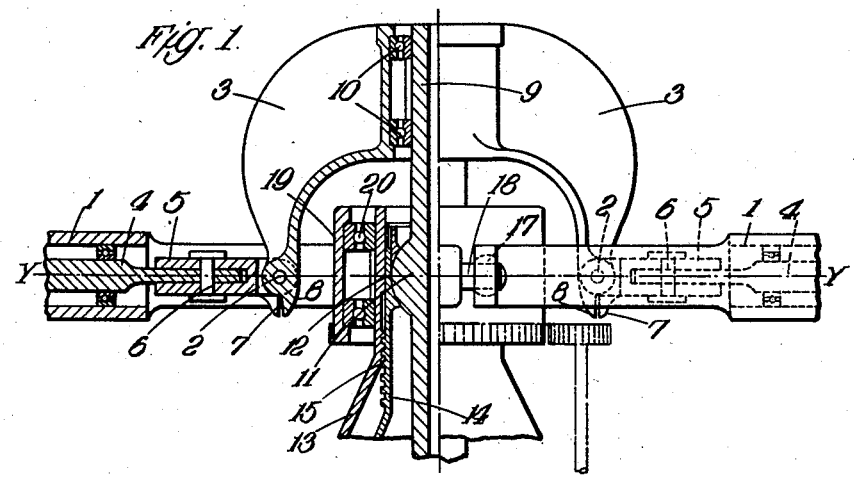
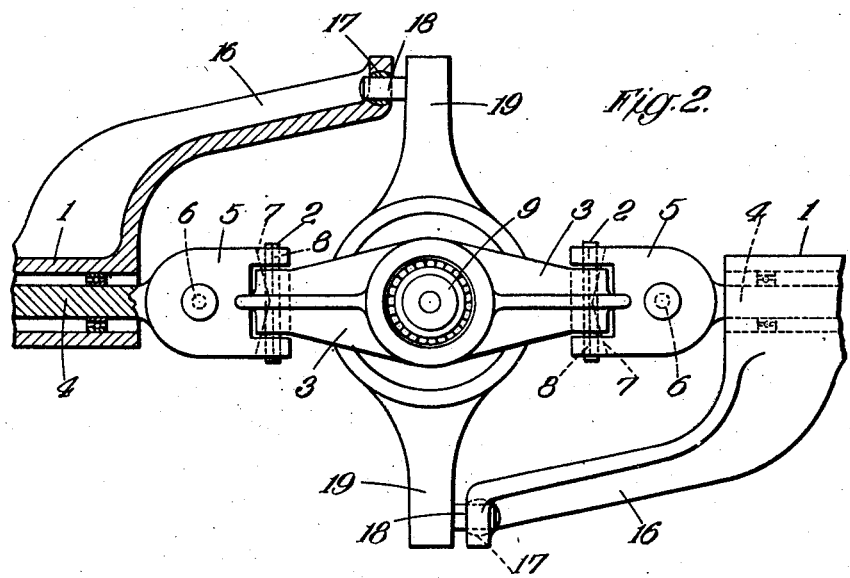
WALTON VICTOR D'ARCY RUTHERFORD
RAOUL HAFNER
INVENTORS
By Otto Munk
their Att'y.

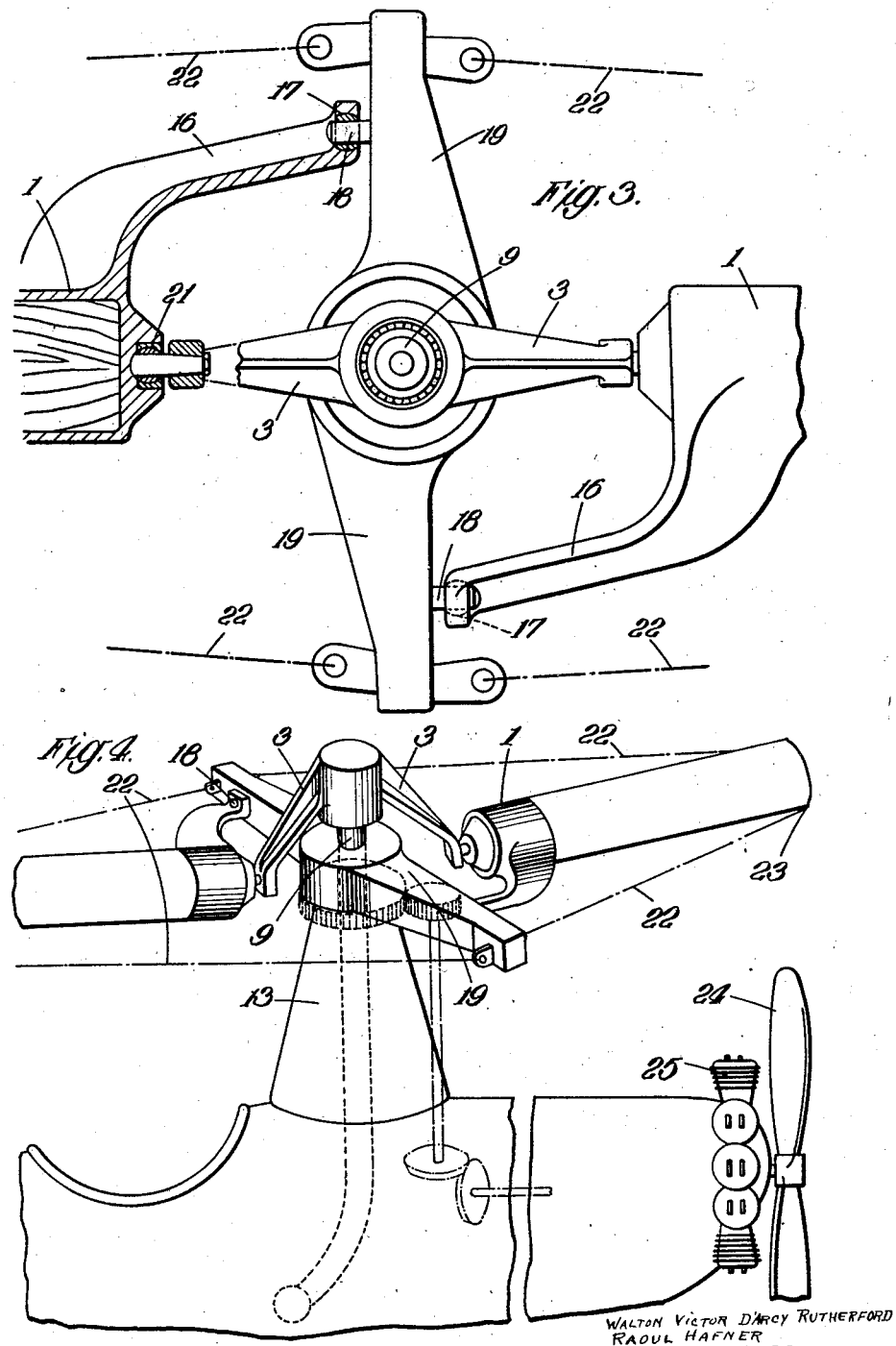

Patented Feb. 19, 1935

1,992,015

UNITED STATES PATENT OFFICE 1,992,015

ROTATIVE WING AIRCRAFT

Walton Victor D'Arcy Rutherford, London, England, and Raoul Hafner, Vienna, Austria Application April 25, 1934, Serial No. 722,364
In Great Britain April 25, 1933

6 Claims. (Cl. 244—19)

The present invention relates to rotative wing aircraft, that is to say aircraft comprising a system of supporting surfaces or blades rotative about a vertical or approximately vertical axis, whether power driven to provide direct lift, when the aircraft is usually known as a "helicopter" or freely rotated by passage of the craft through the air, when the latter is popularly known as a "windmill" plane. For simplicity of language in the following description the term "wing unit" will be used to indicate such a system of rotative supporting surfaces or blades, whether autorotative or power driven.

In British Patent No. 385,101 and British patent application No. 8,555/33 means are described for controlling such craft by mounting the individual blades forming the wing unit so that they are freely rotatable about their individual axes, and, as a whole, as well as during their rotation, can be given varying angles of incidence or setting whereby the lifting action can be varied as a whole as well as made different at different points of the circle of revolution.

The primary objects of this invention are to improve the control and simplify the construction of such craft.

According to this invention aircraft of the above kind is provided with means controlled from the cockpit for inclining the axis of rotation of the wing unit in any direction relatively to the body unit, and means, associated with the wing and body units, for varying the inclination of the blades differentially according to the inclination of the wing unit to the body unit. The blades may be connected, against centrifugal force, to an axial rotatable member by means of torsionally flexible, or like frictionless means. The connections of the blades to the axial rotatable member may be such that the blades can flap up and down and also have a limited side movement. Means may also be provided, controlled from the cockpit, for moving the wing unit axially as a whole relatively to the body unit, thereby varying or reversing the inclination of the blades as a whole.

Examples of construction according to the invention will now be described with reference to the accompanying drawings, wherein:—

Figure 1 is a cross sectional side view of the central or hub portion of the structure.

Figure 2 is a plan of Figure 1.

Figure 3 is a plan of a modification.

Figure 4 is a perspective view of the modification shown in Figure 3.

Referring to Figures 1 and 2, the blades 1 of the wing unit are pivoted at 2 on their longitudinal axes X, Y to the hub member 3 through the medium of a torsionally flexible or yieldable member 4 and universal link 5 as described in our British complete Specification No. 23,645 of 1933, so that the blades can flap up and down, and rotate frictionlessly on their axes X, Y or swivel laterally a small amount about the pivot 6 until the end 7 abuts against the bottom 8 of the fork of the link 5.

The hub member 3 is rotatably mounted upon a shaft 9 by ball bearings 10 which shaft is connected by a universal ball joint 11, 12 to a fixed member 13 carried by the body of the machine. The member 12 of the universal ball joint is provided with an external screw thread 14 which is threaded into a corresponding internal thread 15 in the fixed member 13. The blades 1 are provided with radius arms 16 which extend inwardly beyond the pivot 2. These arms 16 are connected by universal ball joints 17 to pivots 18 projecting from the sides of a member 19 which is rotatably mounted upon the fixed member 13 by ball bearings 20, the said ball joints 17 being free to slide on the said pivots. In flight the blades rotate, flapping up and down about the pivot and swivelling laterally about the pivot 6, to meet the changing conditions. An upwardly flapping movement causes the blades to rotate on their longitudinal axes and reduce their inclination to the air and correspondingly downward flapping movement causes the blades to increase their inclination. The universally mounted shaft 9 is either extended downwards to form the control stick or is controlled by any suitable mechanism, not shown, from the control stick so that the inclination of the blades may be varied differentially as desired by inclining the axis of the said shaft relative to the fixed member 13. The inclination of the blades may be altered as a whole by screwing the member 12 up or down within the member 13, thereby enabling the machine to be flown as a helicopter or a windmill plane at will. Any suitable means may be provided for rotating the member 12 for the above purpose. Any suitable means may also be provided for driving the rotatable member 19 and the blades 1 from the engine.

It will be understood that in an alternative construction the hub member 3 and the rotatable member 19 may be interchanged, that is, the hub member 3, with its connected blades, may be rotatably mounted upon the fixed member 13 and the member 19 may be rotatably mounted upon the control shaft 9 with or without any suitable means for driving one or other of these members.

In the modification shown in Figures 3 and 4 the invention is applied to aircraft of the kind set forth in British patent application No. 8,555 of 1933. The roots of the blades 1 are pivoted by slidable ball joints 21 to the hub member 3 which is rotatably mounted on the shaft 9 connected by a universal ball joint to a fixed member 13 as above described, but the said blades are braced against centrifugal force, so as to permit them to flap and rotate about their longitudinal axes frictionlessly, by flexible triangular bracing 22 connected to the extremities of the rotating member 19 mounted for rotation on the fixed member 13, and to an intermediate point 23 on the blade.

Any suitable known mechanism controlled from the cockpit may be provided for controlling the inclination of the axis of rotation of the rotating blades and thereby controlling the machine in the fore and aft and lateral directions.

It will be appreciated that the invention is applicable to both helicopters and "windmill" planes having both flapping and non-flapping blades, and that it may be utilized for converting at will a helicopter into a "windmill" plane and vice versa.

It will be understood that a tractor airscrew 24 may be provided on the body for drawing the machine through the air when functioning as a "windmill" plane. This airscrew may be driven by means of a clutch from an engine driving the wing system or an auxiliary engine 25 may be provided for the purpose.

We claim:—

1. In a rotary wing aircraft, in combination, a wing rotatable about its longitudinal axis and about an axis perpendicular to its longitudinal axis, a rotatable head mounted for rocking motion about its axis, a flexible connection between said head and said wing, a second rotatable member adapted to continuously remain in the same plane with respect to the aircraft and means connecting said wing member with said second rotatable member whereby rocking motion of the head member causes rotation of the wing about its longitudinal axis.

2. In a rotary wing aircraft, in combination, a wing rotatable about its longitudinal axis and an axis perpendicular to its longitudinal axis, a rotatable universally mounted head, a flexible connection between the longitudinal axis of the wing and the head, a second rotatable member adapted to rotate in a single plane and means connecting the wing with said second rotatable member.

3. In a rotary wing aircraft, in combination, a rotatable member, a wing having a laterally extended arm universally mounted on said rotatable member, a head member having a shaft depending therefrom, said shaft extending through the axis of said rotatable member and being universally mounted therein, whereby said head may be rocked with respect to said rotatable member, and a torsionally flexible member arranged along the longitudinal axis of said wing, having one of its ends secured to said longitudinal axis at a point intermediate its ends and having its other end pivotally connected to said head member.

4. A rotary wing aircraft according to claim 3, in which the shaft of the head member depends into the cockpit of the craft and terminates in a handle whereby said head member can be rocked manually.

5. A rotary wing aircraft according to claim 3, in which stays are provided to take up the centrifugal and lateral forces imposed on said wing member.

6. A rotary wing aircraft according to claim 3, in which the torsionally flexible member is universally connected to the head member.

RAOUL HAFNER.
WALTON VICTOR D'ARCY RUTHERFORD.